(12) United States Patent
Mittal et al.

(10) Patent No.: US 10,129,687 B2
(45) Date of Patent: Nov. 13, 2018

(54) COMPRESSED SENSING WITH MACHINE-TO-MACHINE COMMUNICATION

(71) Applicant: BioBit Inc., Palo Alto, CA (US)

(72) Inventors: Rohit Mittal, Sunnyvale, CA (US); Neeraj Jhanji, Tokyo (JP)

(73) Assignee: BIOBIT, INC., Palo Alto, CA (US)

( * ) Notice: Subject to any disclaimer, the term of this patent is extended or adjusted under 35 U.S.C. 154(b) by 191 days.

(21) Appl. No.: 14/823,114

(22) Filed: Aug. 11, 2015

(65) Prior Publication Data

US 2016/0044439 A1 Feb. 11, 2016

Related U.S. Application Data

(60) Provisional application No. 61/999,955, filed on Aug. 11, 2014.

(51) Int. Cl.
| | | |
|---|---|---|
| *H04W 4/70* | (2018.01) | |
| *H04W 4/00* | (2018.01) | |
| *H04W 52/02* | (2009.01) | |
| *H04W 84/18* | (2009.01) | |

(52) U.S. Cl.
CPC ............. *H04W 4/005* (2013.01); *H04W 4/70* (2018.02); *H04W 52/0222* (2013.01); *H04W 84/18* (2013.01); *Y02D 70/00* (2018.01); *Y02D 70/142* (2018.01); *Y02D 70/144* (2018.01); *Y02D 70/164* (2018.01); *Y02D 70/21* (2018.01); *Y02D 70/22* (2018.01); *Y02D 70/26* (2018.01)

(58) Field of Classification Search
None
See application file for complete search history.

(56) References Cited

U.S. PATENT DOCUMENTS

| | | |
|---|---|---|
| 5,836,982 A | 11/1998 | Muhlenberg et al. |
| 7,592,808 B1 | 9/2009 | King |
| 2002/0026122 A1 | 2/2002 | Lee et al. |

(Continued)

OTHER PUBLICATIONS

Anna M. R. Dixon et al., "Compressed Sensing System Considerations for ECG and EMD Wireless Biosensors", IEEE Transactions on Biomedical Circuits and Systems, Apr. 2012, vol. 6, No. 2, 11 pages.

(Continued)

*Primary Examiner* — Nicholas Sloms
(74) *Attorney, Agent, or Firm* — Mattingly & Malur, PC

(57) ABSTRACT

Some examples include a plurality of secure low-power compressive sensing sensor blocks able to communicate with each other and with a computing device to perform spatial and/or temporal compressive sensing. As one example, a first sensor block may obtain data by randomly sampling a sensor signal from a first sensor coupled to the first sensor block. The first sensor block may send the data obtained from the randomly sampled sensor signal to at least one other sensor block of the plurality of sensor blocks, wherein the data is distributed to the plurality of sensor blocks. In addition, at least one of the first sensor block or another sensor block may process the data to at least one of packetize or encrypt the data. The first sensor block and/or the other sensor block may send the processed data to the computing device.

18 Claims, 7 Drawing Sheets

(56) References Cited

U.S. PATENT DOCUMENTS

| | | | |
|---|---|---|---|
| 2008/0292105 A1* | 11/2008 | Wan | H04L 9/0825 380/282 |
| 2008/0304664 A1* | 12/2008 | Suthaharan | H04L 9/0662 380/46 |
| 2009/0222226 A1 | 9/2009 | Baraniuk et al. | |
| 2011/0080349 A1 | 4/2011 | Holbein et al. | |
| 2011/0082377 A1 | 4/2011 | Mahajan et al. | |
| 2011/0134906 A1* | 6/2011 | Garudadri | G01D 21/00 370/350 |
| 2011/0191496 A1* | 8/2011 | Luo | G06F 15/16 709/247 |
| 2012/0130645 A1 | 5/2012 | Garudadri et al. | |
| 2013/0162457 A1 | 6/2013 | Gangopadhyay et al. | |
| 2015/0039260 A1* | 2/2015 | Niskanen | G06K 9/6244 702/141 |

OTHER PUBLICATIONS

Pawan K. Baheti et al., "An ultra low power pulse oximeter sensor based on compressed sensing", 2009 Body Sensor Networks, 5 pages.

Emmanuel J. Candes et al., "An Introduction to Compressive Sampling", IEEE Signal Processing Magazine(21), Mar. 2008, 10 pages.

Wayne Talley et al., "Recent Developments for SAR and Sigma Delta ADCs", www.embedded.com/print/4013628, Jun. 27, 2005, 3 pages.

\* cited by examiner

600

```
┌─────────────────────────────────────────────────────────────┐
│ A FIRST SENSOR BLOCK OF A PLURALITY OF SENSOR BLOCKS TAKES A RANDOM │
│ SAMPLE OF A SENSOR SIGNAL AND OUTPUTS RAW COMPRESSED SENSING DATA   │
│              COMPRISING THE RANDOM SAMPLE                   │
│                          602                                │
└─────────────────────────────────────────────────────────────┘
                              ↓
┌─────────────────────────────────────────────────────────────┐
│       A POST PROCESSOR RECEIVES THE RAW COMPRESSED SENSING DATA     │
│                          604                                │
└─────────────────────────────────────────────────────────────┘
                              ↓
┌─────────────────────────────────────────────────────────────┐
│  A COMMUNICATION INTERFACE SENDS THE RAW COMPRESSED SENSING DATA    │
│    FROM THE FIRST SENSOR BLOCK TO AT LEAST ONE OTHER SENSOR BLOCK   │
│                          606                                │
└─────────────────────────────────────────────────────────────┘
                              ↓
┌─────────────────────────────────────────────────────────────┐
│ THE POST PROCESSOR IN THE FIRST SENSOR BLOCK AND/OR IN ANOTHER      │
│ SENSOR BLOCK PACKETIZES AND/OR ENCRYPTS THE RAW COMPRESSED          │
│           SENSING DATA TO GENERATE COMPRESSED SENSING DATA  │
│                          608                                │
└─────────────────────────────────────────────────────────────┘
                              ↓
┌─────────────────────────────────────────────────────────────┐
│ THE COMMUNICATION INTERFACE IN THE FIRST SENSOR BLOCK AND/OR IN THE │
│ OTHER SENSOR BLOCK SENDS THE COMPRESSED SENSING DATA TO AT LEAST    │
│         ONE OF A LOCAL OR REMOTE COMPUTING DEVICE           │
│                          610                                │
└─────────────────────────────────────────────────────────────┘
                              ↓
┌─────────────────────────────────────────────────────────────┐
│ THE COMPUTING DEVICE RECONSTRUCTS THE COMPRESSED SENSING DATA TO    │
│         BE REPRESENTATIVE OF THE SENSOR SIGNAL              │
│                          612                                │
└─────────────────────────────────────────────────────────────┘
```

FIG. 6

COMPRESSED SENSING WITH MACHINE-TO-MACHINE COMMUNICATION

CROSS-REFERENCE TO RELATED APPLICATION

This application claims the benefit of U.S. Provisional Patent Application No. 61/999,955, entitled "A distributed compressed sensing framework for m2m communication", filed on Aug. 11, 2014, which is incorporated by reference herein in its entirety.

BACKGROUND

Machine-to-machine (m2m) sensing applications are becoming increasingly common due to the ubiquity of sensors and the demand for the ability to monitor many variables. Examples of these variables include environment (e.g., temperature, light), infrastructure (e.g., vibrations, strain, breakage), and numerous other applications. Lowering the computing requirements, power consumption, and cost of sensors for m2m sensing may help to increase the use and effectiveness of m2m systems. However, conventional sensors, sensor blocks, and associated components may often continuously operate at full speed, collecting large amounts of data. A sensor block may receive the sensor data and may often transmit the sensor data wirelessly to another device. Further, in some examples, the sensor block may encrypt this data. Accordingly, conventional sensor blocks that receive and convey sensor signals may consume a substantial amount of power.

As an example, suppose an m2m sensor network includes a plurality of sensors and each sensor generates a signal in which the signal bandwidth includes frequencies up to 1 KHz. Thus, an analog-to-digital converter (ADC) may need to perform sampling of the analog signal at a rate of at least 2 KHz, which is the Nyquist rate of the highest frequency in the signal. In addition, a transmitter may transmit data at that same rate, i.e., 2 KHz. Thus, when present, a transmitter may consume a large percentage of the total power consumed by the sensing device. Further, other components of the sensing device may also run at or above the Nyquist rate to match the operating speeds of the ADC and the transmitter.

In addition, a computing device that receives the data from the sensing devices may need to store the large amount of sensor data and may further process the data. For example, the computing device may perform a substantial amount of data analysis and may generate a visual display of the data obtained by the sensors and sensor blocks. Receiving and processing these large amounts of data may lead to high storage costs and may consume a significant amount of processing time and power.

Furthermore, ensuring security of the sensor data sent from the sensor blocks to the computing device and to other sensor block may also drain considerable resources. For instance, sending data over wireless links may employ some mode of encryption, which may consume additional power and resources of the sensor blocks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 is a flow diagram illustrating an example process according to some implementations.

DETAILED DESCRIPTION

Figure 1:
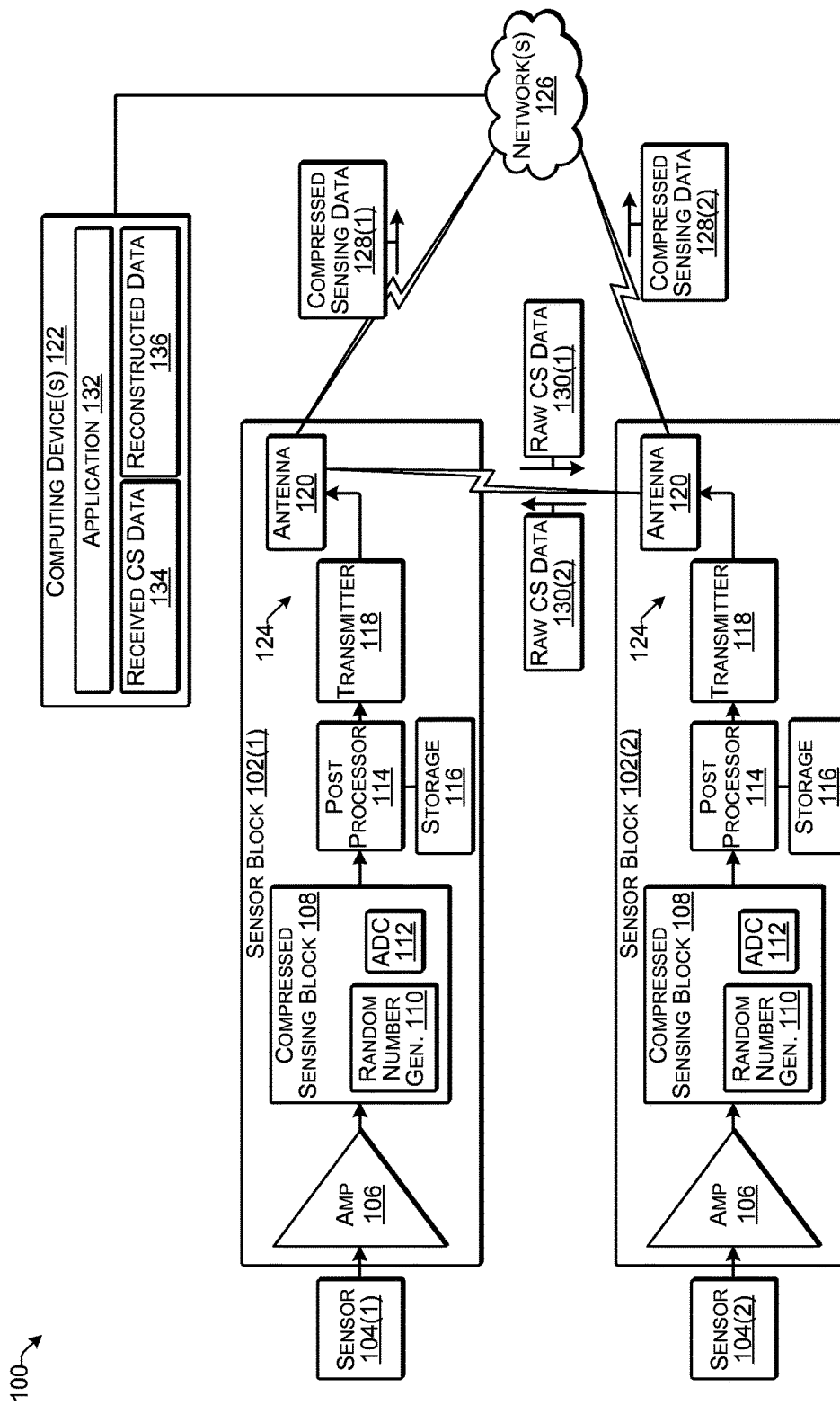
FIG. 1 illustrates an example compressed sensing system with sensor-to-sensor communication according to some implementations.

Some implementations herein include techniques and arrangements for a sensor platform including machine-to-machine (m2m) communication and/or m2m monitoring. For instance, a plurality of sensor blocks may sense sparse signals from respective sensors using compressed sensing (CS) in a distributed manner and may communicate with the other sensor blocks. In some examples, the sensor blocks may send compressed sensing data to local and/or remote computing devices that process and reconstruct the compressed sensing data to obtain a representation of the original sensor signal. Further, some examples employ distributed compressed sensing in m2m applications that enable universality, lower power usage, and lower cost for m2m applications, such as Internet of Things, Internet of everything, etc.

In some examples, a compressive sensing m2m technique may include the transmission of compressed sensing data from a sensor block to other sensor blocks as well as to a computing device. This may be considered in contrast to other sensing techniques, such as for mobile sensors (e.g., proximity sensors), which are self-contained units. In the m2m techniques herein, the sensors may consume a relatively small amount of power. For instance, sensors with lower the power consumption may generally be applied to a larger number of applications. Accordingly, implementations herein may enable secure and low-power sensor applications.

As one example, compressed sensing may be used to obtain sparse signals from an analog sensor signal received from a sensor coupled to a sensor block. The data obtained by the compressed sensing techniques herein may be sent subsequently to other sensor blocks and to the computing device that reconstructs the sensor signal. In addition, examples herein enable processing advantages, such as less overall data to process and lower data storage utilization. Further, some examples include an additional layer of security for data sent from a sensor block to the computing device. The sensor systems disclosed herein lower the costs of operating sensors, e.g., computation costs, transmission costs, and storage costs. For instance, by lowering the rate of sampling as well as by using spatial correlation, the examples herein can use less storage locally and still obtain accurate data on the sensed environment.

A seminal paper on compressed sensing is "An Introduction to Compressive Sampling", Emmanuel J. Candes and Michael B. Wakin, IEEE Signal Processing Magazine, March 2008, which is incorporated by reference herein. Compressed sensing relies on two principles: sparsity, which pertains to the signals of interest, and incoherence, which pertains to the sensing modality. The principles of compressed sensing are based on efficient sensing or sampling protocols that capture a useful information content embedded in a sparse signal and condense this useful information into a small amount of data.

In some implementations, a platform for m2m sensor communication may include a plurality of sensor blocks and a connected computing device that may receive compressed sensing data from the sensor blocks. In some cases, each sensor block may include an amplifier, a compressed sensing block, a post processor, and a transmitter or other communication interface. Each sensor block may receive a sensor signal from a respective sensor, may extract compressed sensing data randomly from the sensor signal, and may transmit the compressed sensing data to a computing device that may store and reconstruct the compressed sensing data, and may further perform feature extraction to provide relevant data. In some examples, the compressed sensing data may be sent to and reconstructed by a local computing device, while in other examples, the compressed sensing data may be sent to and reconstructed by a server in the cloud and/or other connected computing device that performs the reconstruction of the compressed sensing data.

In addition, in some cases, the sampled data may be sent from a first sensor block to at least one other sensor block of a plurality of sensor blocks. For instance, the raw data may be sent and distributed among a plurality of sensor blocks that are in communication with each other, such as through a wireless network. In some cases, the data may be distributed to the plurality of sensor blocks using point-to-point network communications. In other cases, the data may be distributed to the plurality of sensor blocks using multi-hop networking techniques.

In some implementations, the compressed sensing block in each sensor block may include a random number generator or pseudorandom number generator and an analog-to-digital converter (ADC). The random number generator may cause the ADC to randomly sample an input signal received from the sensor, or from an amplifier that amplifies the signal from the sensor. In addition, the random number generator can also be used to generate a randomization matrix for securing/encrypting the compressed sensing data sent from the sensor block to the computing device or to another sensor block. Accordingly, the computing device or the other sensor block that receives the compressed sensing data from the first sensor block may use a corresponding randomization matrix to read the received compressed sensing data.

In some examples, each sensor block may include a storage that may receive the compressed sensing data from the compressed sensing block, and the compressed sensing data may be further subject to post processing prior to sending to the computing device. For instance, in the case that the compressed sensing data is transmitted wirelessly, the post processor may packetize the data, add transmission headers, timestamps, or the like. In some examples, the storage may be one or more buffers that store the compressed sensing data temporarily while the post processing is performed. In other examples, the storage may be a larger memory or other suitable storage device able to store a substantial amount of compressed sensing data, and which may be duty cycled to further reduce power consumption of the sensor block. As one example, the storage may typically not consume power unless the compressed sensing block is adding sensed data to the storage.

The sensor blocks may transmit compressed sensing data between the sensor blocks using any type of network topology such as a mesh (fully connected or not), point-to-point or hub and spoke and using any routing technique such as flooding (anycast), multicast or unicast. Further, the sensor block or another one of the sensor blocks may transmit the compressed sensing data to a computing device, either through a direct connection or over one or more networks. The computing device that receives the compressed sensing data may include an application configured to reconstruct the compressed sensing data into a meaningful representation of the sensed signal. Furthermore, the computing device may perform predictive analytics on the sensed data, may store the reconstructed data, and may make the reconstructed data accessible to users, third party tools, and so forth.

In some examples, the sensor block may be implemented on an application-specific integrated circuit (ASIC) with merely a few external components, such as a sensor and an antenna. For instance, the sensor block may include a random number generator or pseudorandom number generator and a switched capacitor mixed signal block incorporated into the ASIC. In some cases, the sensor block may switch between a random linear combination of sensed data or sampling the sensed data. A linear combination implies a matrix multiplication between random weights and samples of the input data. Furthermore, the sensor block may include a clock gating signal controlled by a random time instance. The random time instance may be controlled based on a unique input such as a network IP address or by an input from the computing device.

Figure 5:
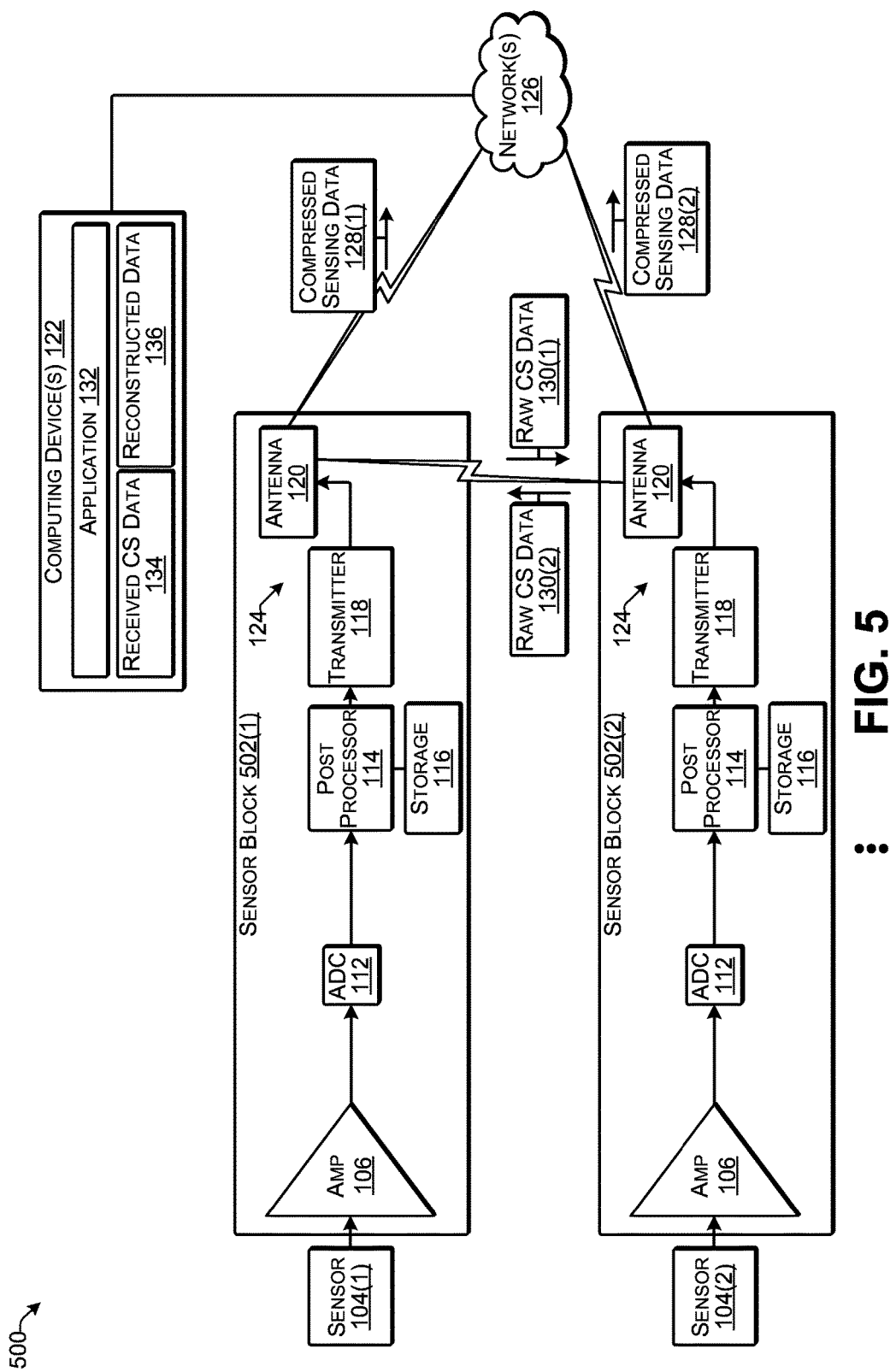
FIG. 5 illustrates an example system having a plurality of sensor blocks duty cycled to enable spatial compressive sensing according to some implementations.

In some implementations as illustrated in FIG. 5, the compressed sensing block may not be included in the sensor block and the sensor block itself may be duty-cycled in a random fashion to take samples, while thereby reducing power consumption. The signal from the sensor block may be sent to the computing device and to other sensor blocks. Such a brute force arrangement may be used to emulate spatial compressive sensing for a plurality of sensor blocks.

Furthermore, as mentioned above, the random number generator in the sensor block may also be used for securely transmitting the compressed sensing data. For instance, the sensor block may employ the random number generator to generate a multiplication matrix for compressed sensing, and the transmitter may use this matrix for securely transmitting the compressed sensing data. A computing device that receives the compressed sensing data may use the same random number generator and a decompression engine for decoding the received data.

For discussion purposes, some example implementations are described in the environment of compressive sensing sensor blocks able to communicate with each other. However, implementations herein are not limited to the particular examples provided, and may be extended to other types of sensors, other usage environments, other system architectures, other communication techniques, and so forth, as will be apparent to those of skill in the art in light of the disclosure herein.

FIG. 1 illustrates an example system 100 for compressive sensing with sensor-to-sensor communication according to some implementations. The system 100 includes a plurality of compressive sensing sensor blocks 102(1), 102(2), . . . , each of which may receive a sensor signal from a respective sensor 104(1), 104(2), . . . . Each sensor 104 may include any suitable sensor. In some examples, the sensor 104 may include one or more electrodes. Further, in some examples, the sensor 104 may be a micromachined device or other sensing device, such as a light sensor, temperature sensor, vibration sensor, gas sensor, strain sensor, sound sensor, contaminant sensor, smoke detector, accelerometer, gyroscope, pressure sensor, compass, proximity sensor, Global Positioning System (GPS) location sensor, or the like.

In some cases, the sensor blocks 102 may further include an amplifier 106. For instance, the amplifier 106 may amplify the sensor signal received from the sensor 104. In other cases, the amplifier 106 may be omitted depending on the type and configuration of the sensor 104, the magnitude of the sensor signal, and so forth.

The sensor blocks 102 may further include a compressed sensing block 108 for performing compressed sensing on the sensor signal received from the amplifier 106 and/or the sensor 104. For instance, the compressed sensing block 108 may include a random number generator or pseudorandom number generator 110 (hereafter referred to as a "random number generator") and an analog-to-digital converter (ADC) 112. The random number generator 110 may generate a random value or pseudorandom value using any of various techniques. The random values may be used for controlling sensor signal sampling performed by the ADC 112. The ADC 112 may convert the sensor signal from an analog signal to a digital signal based on the random values, so as to generate a sparse random sampling of the sensor signal, which is output as compressed sensing data. Additional details of the compressed sensing block 108 are discussed below with respect to FIG. 2.

The sensor blocks 102 may further include a post processor 114 and data storage 116. The storage 116 may receive the compressed sensing data from the ADC 112, and the compressed sensing data may be further subject to post processing by the post processor 114 prior to sending to the computing device and/or to another sensor block 102. For instance, in the case that the compressed sensing data is transmitted wirelessly by a transmitter 118 and antenna 120, the post processor 114 may packetize the data, add transmission headers, timestamps, or the like. Further, in some examples, the post processor 114 may encrypt the compressed sensing data prior to sending the data to one or more computing devices 122 and/or to one or more other sensor blocks 102.

In some examples, the storage 116 may merely be one or more buffers that store the compressed sensing data temporarily while the post processing is performed. In other examples, the storage 116 may be a larger memory or other suitable storage device able to store a substantial amount of compressed sensing data. Additionally, in some instances, the storage 116 may be duty cycled to further reduce power consumption of the sensor block 102. As one example, the storage 116 may typically not consume power unless the compressed sensing block 108 is adding compressed sensing data to the storage 116.

Further, in some cases, the post processor 114 and/or the transmitter 118 may normally be in an off condition and may periodically be wakened to send a threshold amount of stored compressed sensing data to the computing device 122. For instance, to reduce power, post processor 114 and/or transmitter 118 can queue the packets of compressed sensing data in the storage 116 and then transmit in burst mode instead of in a continual fashion. Thus, in some examples, at least one of the storage 116, the post-processor 114, or the communication interface 124 may cycle between an active state and a quiescent state based at least in part on the occurrence of sampling of the sensor signal by the compressed sensing block 108 and/or based on the amount of compressed sensing data stored in the storage 116 reaching a threshold amount and/or based on user input or action. Accordingly, implementations herein are able to achieve significant power savings in comparison to conventional sensing blocks that continuously send sensor data to a computing device or other sensor blocks.

Further, in some examples, such as in the case that the computing device 122 is a local computing device, the computing device 122 may be similarly duty cycled, such as being wakened based on receiving a burst of compressed sensing data being sent from a sensor block 102. As another alternative, the computing device 122 may wake periodically by itself or based on user input or action and poll a plurality of the sensor blocks 102 for compressed sensing data, receive the compressed sensing data, perform processing or send the compressed sensing data to another computing device over the networks 126, and then return to a quiescent state.

Furthermore, while a transmitter 118 and antenna 120 are shown in the example of FIG. 1 as an example communication interface 124, in other examples, a different type of communication interface 124 may be used for conveying the compressed sensing data from the sensor block 102 to the computing device 122 and/or to other sensor blocks 102. Examples of other types of communication interfaces 124 may include hardwired connections, pluggable connections, optical communication interfaces, and so forth. For instance, in some examples, the communication interface 124 of the sensor block 102 may be configured to communicate over a hardwired connection directly with a local computing device or other sensor blocks 102. Additionally or alternatively, the communication interface may communicate through one or more wires with the one or more networks 126, such as for sending compressed sensing data to a remote computing device. Accordingly, there is nothing limiting the sensor systems herein to employing only a wireless network.

In some examples, the computing device 122 may be a local computing device that is local to the sensor blocks 102, and may be directly connected, such as by a wire, or may receive direct wireless communication, such as through BLUETOOTH® or other short range wireless communication technology. In other examples, as illustrated, the computing device 122 may be a local computing device or a remote computing device accessed over the one or more networks 126. For instance, the computing device 122 may be a local computing device, such as a desktop or laptop computer, tablet, smartphone, smartwatch, or other computing device, accessed through a local area network. Alternatively, the computing device 122 may be a remote computing device, such as in the case of a cloud-based server, web server, or the like, accessed through the Internet or other suitable wide area network. Further, in some examples, there may be multiple computing devices 122, such as both a local computing device and a remote computing device. For example, the local computing device may receive compressed sensing data 128 from the sensor blocks 102, and may forward the compressed sensing data to a remote computing device, with or without performing any processing or reconstruction of the compressed sensing data.

The sensor blocks 102 may receive real life sensor data (such as temperature data, etc.) through an analog sensor signal and may convert this sensor signal into digital data in the compressed sensing block 108. This raw compressed sensing data may be further processed by the post processor 114 where addition of packet headers, encryption, etc. may be accomplished. Subsequently the packetized data may be sent as compressed sensing data 128 to the computing device 122 such as through the one or more networks 126 or directly. In addition, the raw compressed sensing (CS) data 130 may be sent from one sensor block 102 to one or more other sensor blocks 102, creating a meshed or multi-hop sensor network. In some cases, the raw CS data 130 may not be packetized, may not include headers, and/or may not include encryption. While in the example of FIG. 1, only two sensor blocks 102 are shown for clarity, in other examples, there may be any number of the sensor blocks 102 in communication with the computing device 122 and each other.

The one or more networks 126 can include any suitable network, including a wide area network, such as the Internet; a local area network, such as an intranet; a wireless network, such as a cellular network; a local wireless network, such as Wi-Fi; close-range wireless communications, such as BLU-ETOOTH®; a wired (for example fiber, coaxial or copper) network, such as Ethernet; or any other suitable network, or any combination thereof. Accordingly, the one or more networks 126 may include both wired and/or wireless communication technologies. Components used for such communication technologies can depend at least in part upon the type of network and/or the environment selected. Protocols for communicating over such networks are well known and will not be discussed herein in detail. Accordingly, the transmitter 118 or other communication interface 124 of each sensor block 102 may be configured for sending compressed sensing data 128 over the one or more networks 126 to the computing device 122, and may be further configured for sending the raw CS data 130 to one or more other sensor blocks 102.

The computing device 122 may include an application 132 that may receive the compressed sensing data 128 as received CS data 134. The computing device 122 may further execute the application 132 to reconstruct the compressed sensing data to obtain reconstructed data 136. For example, the application 132 may reconstruct the sparse signal in the received compressed sensing data 134 to obtain a representation of the sensor signal received from each sensor 104. There are many forms of reconstruction algorithms, some of which are heuristic (e.g., greedy algorithms), whereas the others are more linear (e.g., L1 minimization algorithm).

As one example, for CS reconstruction models using constrained L1 minimization, larger coefficients are penalized heavily in the L1 norm. Some examples may employ a weighted formulation of L1 minimization designed to more democratically penalize nonzero coefficients. An iterative algorithm may be used for constructing the appropriate weights. Each iteration may solve one L1 minimization problem by finding the local minimum of a concave penalty function that more closely resembles the L0 norm. An additional parameter, usually to avoid any sharp transitions in the penalty function curve, is introduced into the iterative equation to ensure stability and so that a zero estimate in one iteration does not necessarily lead to a zero estimate in the next iteration. This technique essentially involves using the current solution for computing the weights to be used in the next iteration.

In some examples, the amplifier 106 may be implemented as a switched capacitor amplifier with a chopper or other means of mitigating 1/f noise. For instance, the amplifier 106 may be coupled to various electrodes as the sensor(s) 104 used to measure electrical data directly from a human patient. In other examples, the amplifier 106 may be omitted, such as the case that the sensor signal from the sensor 104 has sufficient magnitude to be detected by the compressed sensing block 108. In some cases, the compressed sensing block 108 may include a switched capacitor multiplier as the ADC 112 where the coefficients are multiplied by an LFSR (linear feedback shift register) that generates the random numbers. Additional details regarding the compressed sensing block 108 are discussed below with respect to FIG. 2.

The post processor 114 may be implemented as a programmable state machine, microprocessor, or the like, that may be configurable for various standards, communication protocols, and security requirements. In addition, the storage 116 may be any suitable type of memory, storage device, or other computer-readable media, some examples of which are discussed below. As one example, the transmitter 118 may include an ultra-low-power switched-capacitor class C amplifier. Consequently, in some cases, the sensor block 102 may be implemented with a complementary metal-oxide semiconductor (CMOS) ASIC and a few external components such as the antenna 120 and the sensor 104.

By not having to store a large amount of data (unlike in the case of Nyquist sampling), and then discarding this data, implementations of compressed sensing herein are able to conserve valuable power. For instance, compressed sensing may employ knowledge of signal sparsity. The compressed sensing block 108 may use a randomization matrix to mix with the input signal received from the amplifier 106. This will also serve to spread the frequency content of the signal and prevent eavesdropping, much like with spread spectrum communication.

By utilizing the compressed sensing blocks 108 in the sensor blocks 102, the sensor system 100 may use substantially less power than conventional sensing techniques. The compressed sensing block 108 operates by relying upon an inherent sparsity of an input signal received from the sensor 104 and the amplifier 106, and without prior knowledge of the input signal, for sampling of the input signal below the Nyquist rate to reduce power consumption. The sampling rate of both the compressed sensing block 108 and the transmitter 118 is reduced by a compression factor when compared to a conventional sensor block. This leads to a direct savings in power. Post processor 114 may also perform post processing operations on less data in sensor block 102 and at a slower rate than in conventional sensor blocks, leading to further power savings. As one example, the compressed sensing block 108 herein may utilize a compression rate of 8×-16×, which will lead to a similar decrease in power consumption, e.g., an order of magnitude, for the sensor block 102 as compared to conventional sensor blocks. To further reduce power it is possible to queue up the compressed sensor data in storage 116 and then only send bursts of the data. Power is also reduced by taking into account spatial sparsity in the implementations of FIGS. 1 and 3. For example, multiple sensor blocks may be distributed spatially from each other and may communicate the raw CS data 130 among each other. As one example, if one of the sensor blocks takes a random sample, the other sensor blocks may receive a communication from the sensor block that took the sample, and as a result, may delay taking samples themselves. This communication may include the sampled data or simply the information that such a sample was taken. Such a distributed scenario allows the sensor blocks to shut down and only sample (at the reduced rate) for a fraction of the time. This reduces the average power consumption, even though the peak power consumed when sampling remains the same.

Compressed sensing is based on the principle that, through optimization, the sparsity of a signal can be exploited to recover it from far fewer samples than required by the Shannon-Nyquist sampling theorem. There are two conditions under which recovery is possible. The first one is sparsity, which requires the signal to be sparse in some domain. The second one is incoherence, which is applied through the isometric property, which is sufficient for sparse signals. Compressed sensing typically starts with taking a weighted linear combination of samples in a basis different from the basis in which the signal is known to be sparse. The number of these samples can be small and still contain nearly all the useful information. Portions of the article "An Introduction to Compressive Sampling," Emmanuel J. Candes and Michael B. Wakin, IEEE Signal Processing Magazine, March 2008, which is incorporated by reference herein, are set forth below to provide additional background information on compressed sensing processing techniques.

Conventional approaches to sampling signals or images follow Shannon's celebrated theorem: the sampling rate must be at least twice the maximum frequency present in the signal (the so-called Nyquist rate). In fact, this principle underlies nearly all signal acquisition protocols used in consumer audio and visual electronics, medical imaging devices, radio receivers, and so on. (For some signals, such as images that are not naturally bandlimited, the sampling rate is dictated not by the Shannon theorem, but by the desired temporal or spatial resolution. However, it is common in such systems to use an antialiasing low-pass filter to band limit the signal before sampling, and so the Shannon theorem plays an implicit role.) In the field of data conversion, for example, standard analog-to-digital converter (ADC) technology implements the usual quantized Shannon representation: the signal is uniformly sampled at or above the Nyquist rate. (IEEE Signal Processing Magazine, March 2008, page 21).

CS theory asserts that one can recover certain signals and images from far fewer samples or measurements than traditional methods use. To make this possible, CS relies on two principles: sparsity, which pertains to the signals of interest, and incoherence, which pertains to the sensing modality.

Sparsity expresses the idea that the "information rate" of a continuous time signal may be much smaller than suggested by its bandwidth, or that a discrete-time signal depends on a number of degrees of freedom, which is comparably much smaller than its (finite) length. More precisely, CS exploits the fact that many natural signals are sparse or compressible in the sense that they have concise representations when expressed in the proper basis ψ.

Incoherence extends the duality between time and frequency and expresses the idea that objects having a sparse representation in ψ must be spread out in the domain in which they are acquired, just as a Dirac or a spike in the time domain is spread out in the frequency domain. Put differently, incoherence says that unlike the signal of interest, the sampling/sensing waveforms have an extremely dense representation in ψ.

The crucial observation is that one can design efficient sensing or sampling protocols that capture the useful information content embedded in a sparse signal and condense it into a small amount of data. These protocols are nonadaptive and simply require correlating the signal with a small number of fixed waveforms that are incoherent with the sparsifying basis. What is most remarkable about these sampling protocols is that they allow a sensor to very efficiently capture the information in a sparse signal without trying to comprehend that signal. Further, there is a way to use numerical optimization to reconstruct the full-length signal from the small amount of collected data. In other words, CS is a very simple and efficient signal acquisition protocol which samples—in a signal independent fashion—at a low rate and later uses computational power for reconstruction from what appears to be an incomplete set of measurements. (IEEE Signal Processing Magazine, March 2008, page 22).

Many natural signals have concise representations when expressed in a convenient basis. Consider, for example, an image [ ] and its wavelet transform [ ]. Although nearly all the image pixels have nonzero values, the wavelet coefficients offer a concise summary: most coefficients are small and the relatively few large coefficients capture most of the information . . . . In plain terms, one can "throw away" a large fraction of the coefficients without much loss.

This principle is, of course, what underlies most modern lossy coders such as JPEG-2000 and many others, since a simple method for data compression would be to compute x from f and then (adaptively) encode the locations and values of the S significant coefficients. Such a process requires knowledge of all the n coefficients x, as the locations of the significant pieces of information may not be known in advance (they are signal dependent) . . . . More generally, sparsity is a fundamental modeling tool, which permits efficient fundamental signal processing; e.g., accurate statistical estimation and classification, efficient data compression, and so on. [A] more surprising and far-reaching implication, however, . . . is that sparsity has significant bearings on the acquisition process itself. Sparsity determines how efficiently one can acquire signals nonadaptively. (IEEE Signal Processing Magazine, March 2008, page 23).

In plain English, the Coherence measures the largest correlation between any two elements of the sensing basis Φ and the representation basis ψ. If Φ and ψ contain correlated elements, the coherence is large. Otherwise, it is small . . . . CS is mainly concerned with low coherence pairs. (IEEE Signal Processing Magazine, March 2008, page 23).

1) The role of the coherence is completely transparent; the smaller the coherence, the fewer samples are needed, hence [the] emphasis on low coherence systems in the previous section.

2) One suffers no information loss by measuring just about any set of m coefficients, which may be far less than the signal size apparently demands. If $\mu(\Phi, \psi)$ is equal or close to one, then on the order of S log n samples suffice instead of n.

3) The signal f can be exactly recovered from [a] condensed data set by minimizing a convex functional which does not assume any knowledge about the number of nonzero coordinates of x, their locations, or their amplitudes which we assume are all completely unknown a priori. We just run the algorithm and if the signal happens to be sufficiently sparse, exact recovery occurs.

The theorem indeed suggests a very concrete acquisition protocol: sample nonadaptively in an incoherent domain and invoke linear programming after the acquisition step. Following this protocol would essentially acquire the signal in a compressed form. All that is needed is a decoder to "decompress" this data; this is the role of L1 minimization. (IEEE Signal Processing Magazine, March 2008, page 24).

[Some examples show] that a number of samples just about 4× the sparsity level suffices. Many researchers have reported on similar empirical successes. There is de facto a known four-to-one practical rule, which says that for exact recovery, one needs about four incoherent samples per unknown nonzero term. (IEEE Signal Processing Magazine March 2008, page 26).

Data acquisition typically works as follows: massive amounts of data are collected only to be—in large part— discarded at the compression stage to facilitate storage and transmission. In the language of this article, one acquires a high-resolution pixel array f, computes the complete set of transform coefficients, encode the largest coefficients and discard all the others, essentially ending up with fS. This process of massive data acquisition followed by compression is extremely wasteful (one can think about a digital camera which has millions of imaging sensors, the pixels, but eventually encodes the picture in just a few hundred kilobytes).

CS operates very differently, and performs as "if it were possible to directly acquire just the important information about the object of interest." By taking about O(S log(n/S)) random projections as in "Random Sensing," one has enough information to reconstruct the signal with accuracy at least as good as that provided by fS, the best S-term approximation—the best compressed representation—of the object. In other words, CS measurement protocols essentially translate analog data into an already compressed digital form so that one can—at least in principle—obtain super-resolved signals from just a few sensors. All that is needed after the acquisition step is to "decompress" the measured data.

The fact that a compressible signal can be captured efficiently using a number of incoherent measurements that is proportional to its information level S<<n has implications that are far reaching and concern a number of possible applications. (IEEE Signal Processing Magazine March 2008, page 28).

In the example of FIG. 1 and the other examples herein, the compressed sensing block 108 may rely on the inherent sparsity and incoherence of an input signal received from the sensor 104 and/or the amplifier 106, without prior knowledge of the input signal, for sampling of the input signal below the Nyquist rate. Thus, by sampling below the Nyquist rate, the compressed sensing block 108 enables the sensor block 102 to reduce the overall power consumed. For instance, as discussed additionally below with respect to FIG. 2, the compressed sensing block 108 may include an analog-to-digital conversion block including a circuit to take random samples of a sensor signal and output compressed sensing data comprising the random samples.

The sensed signals are typically sparse in some domain. In addition, the sensed signals are spatially and temporally correlated between the various sensors in a given network. As one example, in the case of temperature monitoring, the temperature will not change much within neighboring sensors. A non-optimized network of sensor blocks may continue to send temperature data regardless of this spatial correlation. In an optimized, spatially correlated network, temperature sensors that are nearby would transit CS data from sensor to sensor (because ambient air temperature typically changes very slowly) with only one or some small number of sensors correlating the received data with its own collected data and sending along to a computing device. Accordingly, implementations herein are able to perform compressive sensing in both the temporal and/or the spatial domain. Some examples herein may utilize both domains and may be referred to a distributed compressive sensing.

In the example of FIG. 1, temporal compressive sensing may be accomplished by randomly sampling the sensor signal (such as temperature) from the sensor 104 at a rate less than the Nyquist rate. By reducing the number of samples of the signal, the power consumed both in taking samples as well as transmission of sensor data is proportionately reduced. Some implementations may utilize a linear combination of some of the samples for easing the reconstruction process. This may slightly increase the power consumption in the sensor blocks. Further, other examples, may allow switching between the two techniques of temporal compressive sensing.

The example of FIG. 1 shows an example of a sensor system 100 that uses temporal compressive sensing. In this example, suppose that the compressed sensing block 108 of first sensor block 102(1) randomly takes a sample from the sensor signal received from its sensor 104(1). The first sensor block 102(1) may store the sampled sensor data in storage 116 and the post processor 114 may use the communication interface 124 to send compressed sensing data 128 to the computing device 122. In addition, the sensor block 102(1) may send raw CS data 130(1) to the second sensor block 102(2). Based on receiving the raw CS data 130(1) from the first sensor block 102(1), the compressed sensing block 108 of the second sensor block 102(2) may delay taking a random sample from the second sensor 104(2).

Subsequently, the compressed sensing block 108 of the second sensor block 102(2) may randomly take a sample of the signal from the second sensor 104(2). The compressed sensing data may be stored in the storage 116 of the second sensor block 102(2), and the post processor may send the sampled signal as compressed sensing data 128(2) to the computing device 122. Additionally, the sensor second sensor block 102(2) may send the raw CS data 130(2) to the first sensor block 102(1). In response to receiving the raw CS data 130(2), the compressed sensing block 108 may delay taking a next random sample from the first sensor 104(1). In some examples, the sensor blocks 102 of the system 100 may be configured to operate as a point-to-point network in which a sensor that takes a sample sends the raw CS data to each of the other sensor blocks 102 in the system 100.

In other examples, sensor blocks 102 may be configured to operate as a multi-hop or meshed network. For example, suppose the first sensor block 102(1) takes a sample of the sensor signal from the sensor 104(1). The sensor block 102(1) may send the compressed sensing data 128(1) to the computing device 122. Further, the sensor block 102(1) may send the raw CS data 130(1) from the first sensor block 102(1) to the second sensor block 102(2). The second sensor block 102(2) may send the raw CS data 130(1) to another sensor block 102, which in turn, sends the raw CS data to yet another sensor block 102, until all the sensor blocks 102 have received the raw CS data 130(1) generated by the first sensor block 102(1). Alternatively, other types of multi-hop network configurations may be used, such as flooding (anycast) in which every sensor block 102 that receives raw CS data 130(1) sends the raw CS data to a plurality of other sensor blocks 102.

The sensor blocks 102 may each employ a randomization matrix to mix with the input sensor signal. This randomization matrix may also be used by the computing device 122 for decompression of the received data. Accordingly, there may be a synchronization mechanism between the sensor blocks 102 and the "authorized" backend, i.e., the computing device 122. There are many ways of synchronization that may be employed by the systems herein, including but not limited to header information, information exchange during pairing, or the like. An unauthorized backend computing device will not be able to decipher the compressed data.

Figure 2:
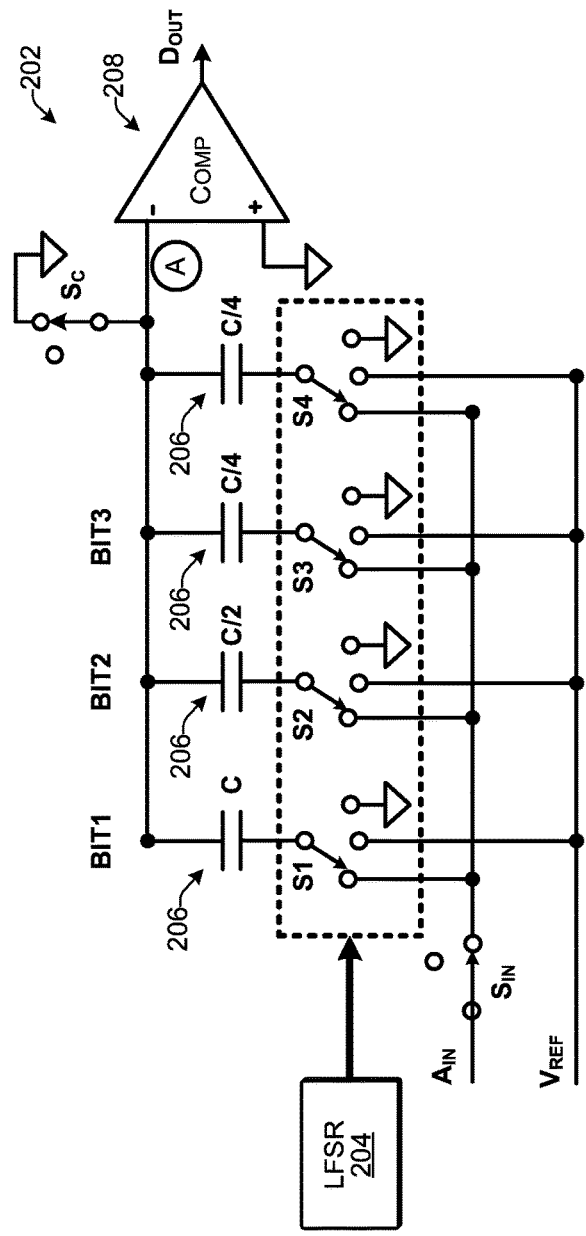
FIG. 2 illustrates an example of a circuit that may be included in a compressed sensing block for performing the compressed sensing according to some implementations.

FIG. 2 illustrates one example of a circuit 200 that may be included in the compressed sensing block 108 for performing the compressed sensing according to some implementations. In this example, the circuit 200 includes an SCDAC (switched capacitor digital-to-analog converter) 202 which may correspond at least in part to the ADC 112 discussed above with respect to FIG. 1. The circuit 200 further includes an LFSR (linear feedback shift register) 204, which may correspond at least in part to the random number generator 110 discussed above with respect to FIG. 1.

The SCDAC 202 includes a series of binary weighted capacitors 206 with their top plates connected to each other and also connected to the inverting input of a comparator 208. The SCDAC 202 further includes four switches S1, S2, S3, and S4, each of which is in line with a bottom plate of a respective one of the capacitors 206. The SCDAC 202 further includes an analog input line $A_{IN}$, an input switch $S_{IN}$, a reference voltage line $V_{REF}$, a comparator switch $S_C$, and an ammeter A.

In some examples, the weighting of each capacitor 206 may be one half the value of its neighbor, as illustrated, in order to prevent improper bit decisions made by the comparator 208. The bottom plate of each capacitor 206 is tied to a respective single-pole, triple-throw switch S1-S4. Each switch S1-S4 connects the individual capacitor 206 to either the voltage reference $V_{REF}$ or ground, depending on whether the respective bit is turned "ON" or "OFF", or to $A_{IN}$ during a sensor signal sampling mode. The function of the comparator 208 is to swing high, if excess charge remains across the SCDAC array after each capacitor 206 is tested, or swing low if no charge is remaining. The input switch $S_{IN}$ between the analog input and the switches S1-S4 controls the sampling and conversion modes of the SCDAC 202.

In addition, the LFSR 204 may include a shift register whose input bit is a linear function of its previous state. As one example, the LFSR 204 may include a shift register whose input bit is driven by the XOR of some bits of the overall shift register value. Because the operation of the register may be deterministic, the stream of values produced by the register is completely determined by its current (or previous) state. Likewise, because the register has a finite number of possible states, it must eventually enter a repeating cycle. However, an LFSR 204 with a well-chosen feedback function can produce a sequence of bits which appears random and which has a very long cycle. Accordingly, the LFSR 204 in this example may serve as a pseudorandom number generator to generate random numbers. Thus, the LFSR 204 may be used to randomly change the bit values of switches S1-S4 in the SCDAC 202. The switches S1-S4 may be configured in one position or another other randomly. The output $D_{OUT}$ is a multiplication of the input signal $A_{IN}$ and the reference voltage $V_{REF}$ or ground based on positions of the switches S1-S4. Any suitable type of LFSR 204 may be used. Further, in other examples, a different type of randomness generator and/or a different type of ADC may be used, with the foregoing being merely one example for discussion purposes. To illustrate, there are many other ways of implementing the compressed sensing block 108, some of which may use an ADC directly, while others may use an analog multiplier and then an ADC. However, in any implementation, the compression and security techniques discussed herein may still be accomplished.

Figure 3:
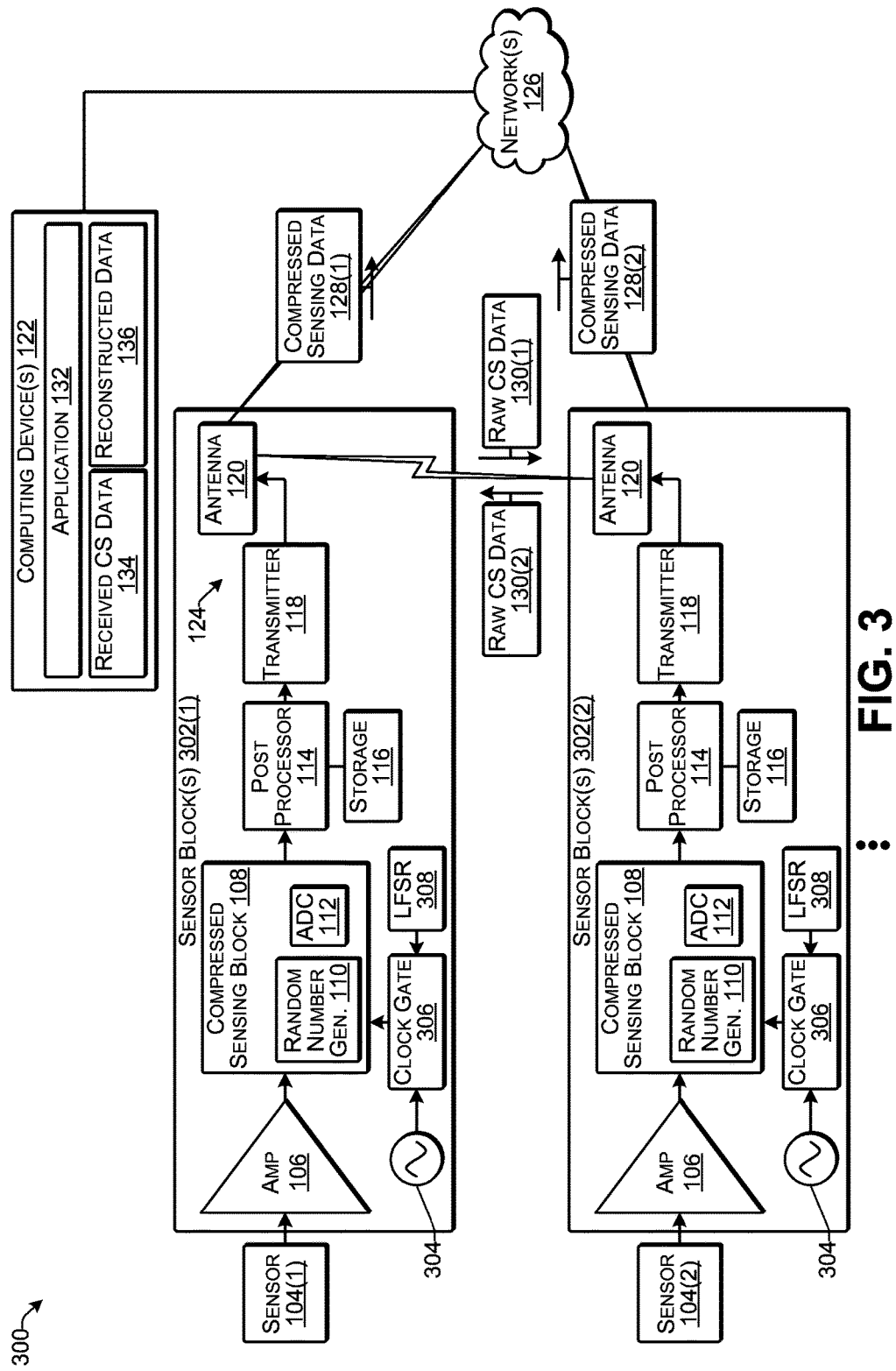
FIG. 3 illustrates an example compressed sensing system with synchronous sensor-to-sensor communication according to some implementations.

FIG. 3 illustrates an example system 300 including a plurality of compressive sensing sensor blocks 302(1), 302(2), . . . , according to some implementations. In this example, the system 300 having the plurality of sensor blocks 302 enables spatial compressive sensing as well as the temporal compressive sensing discussed above with respect to FIG. 1. The example of FIG. 1 uses random back off of sampling to accomplish temporal sparsity. The example of FIG. 3 uses clock gating as a means of accomplishing temporal sparsity. For instance, a randomly seeded LFSR may accomplish clock gating at a random time interval. The addition of clock gating in FIG. 3 makes this example a globally synchronous system as opposed to an asynchronous system as shown in FIG. 1. Although a synchronous system uses more power than an asynchronous system, the synchronous system has the advantage of less design complexity. Each of the sensor blocks 302 may receive a sensor signal from a respective sensor 104, and may include some or all of the components 106, 108, 110, 112, 114, 116, 118, 120, 124, as discussed above with respect to FIG. 1.

The sensor blocks 302 include a circuit to gate a clock used in the sensor block 302. The clock signal may be generated by an oscillator 304 and a gating signal passed by a clock gate 306 may be controlled from an LFSR 308. As one example, the LFSR 308 may be seeded using a network IP address or other suitable known and unique value. In some examples, each sensor block 302 may be implemented as a CMOS ASIC with a few external components such as the antenna 120 and the sensor 104.

As one example, spatial compressive sensing may be accomplished by random duty cycling of the sensor blocks 302 in the sensor system 300. Various ones of the sensor blocks 302 may wake up at random times, take a sample, and transmit the compressed sensing data 128 to the computing device 122. Further, the sensor block 302 that takes the sample, may transmit raw CS data 130 to the other sensor blocks 302 in the sensor system 300.

In some cases, the sensor system 300 may form a multi-hop network. For example, suppose that the first sensor block 302(1) wakes at a random time or otherwise randomly takes a sample of the sensor signal from the sensor 104(1). The sensor block 302(1) may send the compressed sensing data 128(1) to the computing device 122. Further, the sensor block 302(1) may send the raw CS data 130(1) from the first sensor block 302(1) to the second sensor block 302(2). The second sensor block 302(2) may send the raw CS data 130(1) to another sensor block 302, which in turn, sends the raw CS data to yet another sensor block 302, until all the sensor blocks 302 have received the raw CS data 130(1) generated by the first sensor block 302(1). In other examples, the sensor system 300 may be configured as a point-to-point network.

Figure 4:
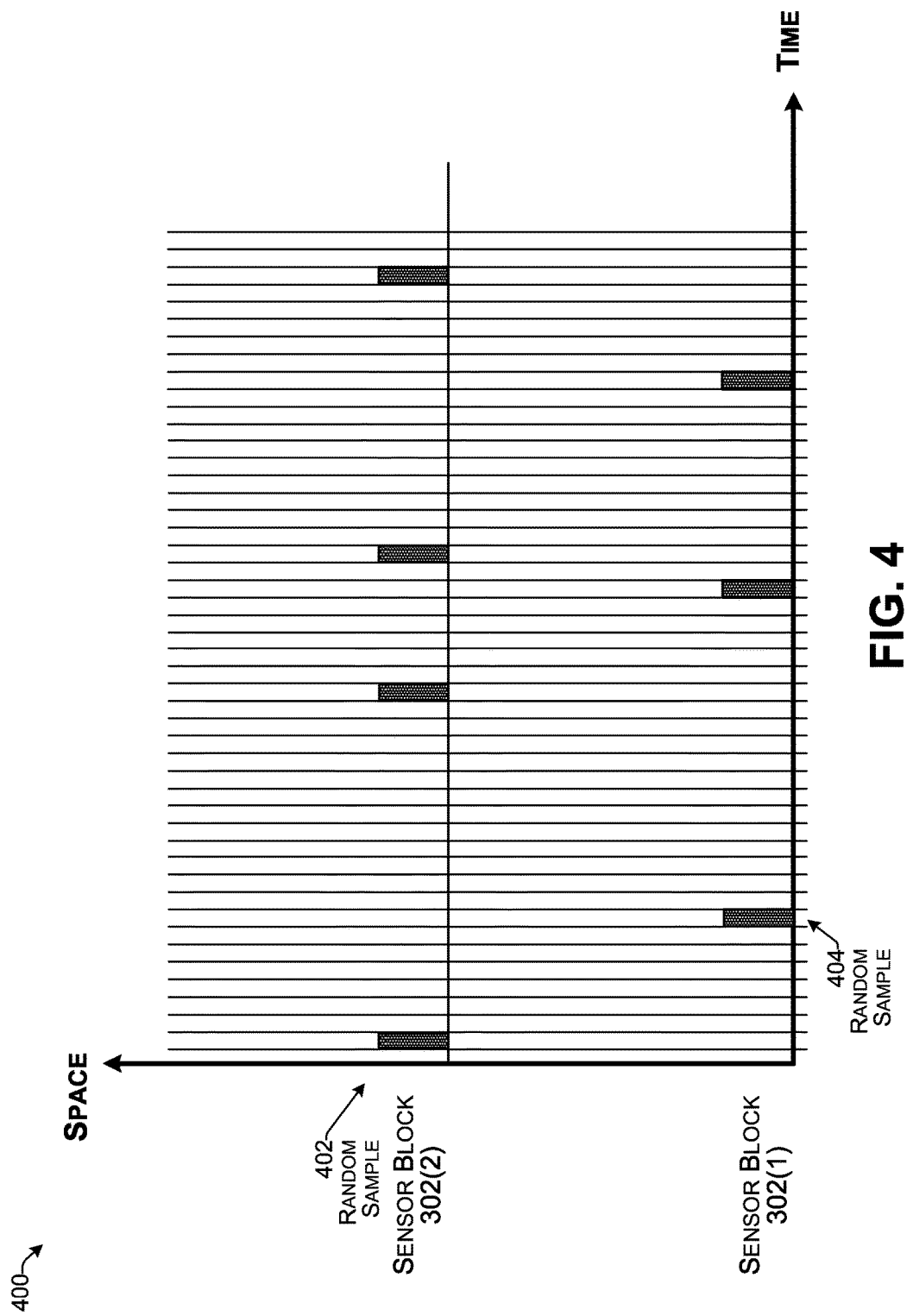
FIG. 4 illustrates examples of sampling data in the temporal and spatial domains according to some implementations.

FIG. 4 illustrates an example graph 400 illustrating sampling data as a function of spatial and temporal sparsity according to some implementations. This example shows that the first sensor block 302(1) takes random samples of the sensor signal at random times. Further, the second sensor block 302(2) also takes random samples at random times. The first sensor and first sensor block 302(1) are separated spatially from the second sensor and second sensor block 302(2). As mentioned above, when the second sensor block 302(2) takes a random sample at a time corresponding to 402, the first sensor block 302(1) may delay taking its own the next random sample 404, and vice versa.

FIG. 5 illustrates an example system 500 having a plurality of compressive sensing sensor blocks 502(1), 502(2), . . . , that are configured to enable spatial compressive sensing according to some implementations. In this example, the compressed sensing blocks 108 may be removed from the sensor blocks 502, except for the ADC 112. The sensor blocks 502 may be duty-cycled in a random fashion to reduce power consumption based on an external input, such as from the computing device 122. The sensor signal from the respective sensor 104 of the sensor block 502 that is wakened may be sent by the sensor block 502 to the computing device 122 and to the other sensor blocks 502 in the system 500. Such a brute force arrangement may be used to emulate spatial compressive sensing for a plurality of sensor blocks 502. The random wake times may accomplish the random projection requirements of compressive sensing.

As one example, the random duty cycle times may be determined by seeding the LFSR (308 in FIG. 3) with the unique IP address (or any other unique parameter) of the sensor blocks 502 in the system 500. As another example, the computing device 122 may determine the random duty cycle times for the sensor blocks 502 in the system 500, such as by using an LFSR or other pseudo-random or random number generator. In some instances, the system 500 may function as a point-to-point m2m network in which each of the sensor blocks 502 communicates directly with the other sensor blocks 502 in the system 500. However, in other examples, the sensor blocks 502 may be configured to function as a multi-hop network, as discussed above.

FIG. 6 is a flow diagram illustrating example process 600 for compressed sensing with sensor-to-sensor communication according to some implementations. The process is illustrated as a collection of blocks in a logical flow diagram, which represents a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, architectures and systems described in the examples herein, although the process may be implemented in a wide variety of other environments, architectures and systems. In some examples, the process 600 may be executed at least in part by the sensor blocks 102, 302, and/or 502.

At 602, a first compressive sensing sensor block of a plurality of compressive sensing sensor blocks takes a random sample of a sensor signal and outputs raw compressed sensing data comprising the random sample. As an example, a compressed sensing block in the first sensor block may use a random number generator and ADC for performing the random sampling.

At 604, a post processor receives the raw compressed sensing data. For example, the post processor may be coupled to the compressed sensing block and may receive the raw data from the compressed sensing block and may store the raw data in a storage.

At 606, a communication interface sends the raw compressed sensing data from the first sensor block to at least one other sensor block. In some examples, the communication interface sends the raw compressed sensing data to each of the other compressive sensing sensor blocks in the system, e.g., in a point-to-point manner. In other examples, the sensor blocks may be configured in a mesh or other multi-hop network configuration in which sensor blocks that receive the raw compressed sensing data may send it to one or more other sensor blocks in the system.

At 608, the post processor in the first sensor block and/or in another sensor block packetizes and/or encrypts the raw compressed sensing data to generate compressed sensing data.

At 610, the communication interface in the first sensor block and/or in the other sensor block sends the compressed sensing data to at least one of a local or remote computing device.

At 612, the computing device reconstructs the compressed sensing data to be representative of the sensor signal. For instance, the computing device that receives the compressed sensing data may use a corresponding random number generator and a decompression engine for decoding the compressed sensing data. Several example algorithms for reconstructing the compressed sensing data are discussed above.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
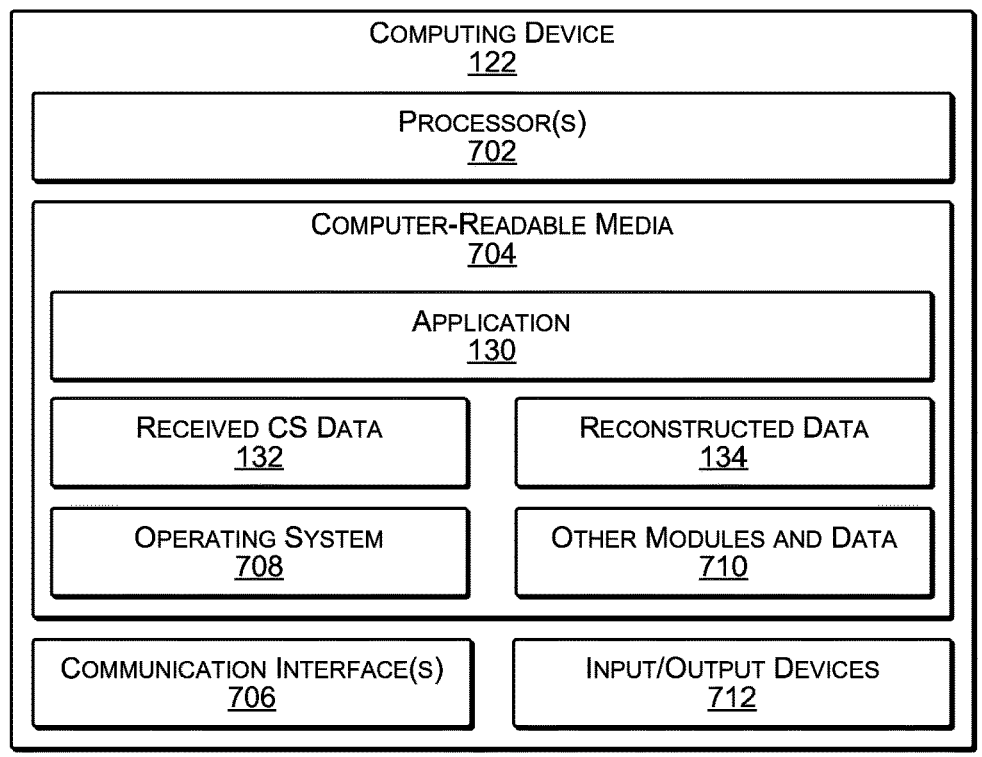
FIG. 7 illustrates select components of one or more example computing devices according to some implementations.

FIG. 7 illustrates select components of the computing device 122 that may be used to implement some functionality of the compressed sensing data storage and/or processing described herein. In some examples, the computing device 122 may be operated by a service provider, and may include one or more servers or other types of computing devices that may be embodied in any number of ways. For instance, in the case of a server, the application, other functional components, and data storage may be implemented on a single server, a cluster of servers, a server farm or data center, a cloud-hosted computing service, a cloud-hosted storage service, and so forth, although other computer architectures may additionally or alternatively be used. Alternatively, in the case of a local computing device 122, the computing device 122 may be a desktop computer, laptop computer, tablet computer, workstation, mobile device, cellphone, smartphone, smartwatch, wearable computing device, or any other computing device having sufficient storage and processing capabilities to perform the functions discussed above.

In the illustrated example, the computing device 122 may include, or may have associated therewith, one or more processors 702, one or more computer-readable media 704, and one or more communication interfaces 706. Each processor 702 may be a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. Such computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device 122, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 may be used to store any number of functional components that are executable by the processors 702. In many implementations, these functional components comprise instructions or programs that are executable by the processors 702 and that, when executed, specifically configure the one or more processors 702 to perform the actions attributed above to the computing device 122. Functional components stored in the computer-readable media 704 may include the application 132. Additional functional components stored in the computer-readable media 704 may include an operating system 708 for controlling and managing various functions of the computing device 122.

In addition, the computer-readable media 704 may store data used for performing the functions and services described herein. Thus, in some examples, the computer-readable media 704 may store the received compressive sensing data 134, and the reconstructed data 136. The computing device 122 may also include or maintain other functional components and data, such as other modules and data 710, which may include programs, drivers, etc., and the data used or generated by the functional components. Further, the computing device 122 may include many other logical, programmatic, and physical components, of which those described above are merely examples that are related to the discussion herein.

The communication interface(s) 706 may include one or more interfaces and hardware components for enabling communication with various other devices, such as over the network(s) 126. For example, communication interface(s) 706 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein. Additionally, in some examples, the computing device 122 may be directly connect to the sensor blocks herein over hardwired connections, pluggable connections, optical communication interfaces, and the like, as additionally enumerated herein.

The computing device 122 may further be equipped with various input/output (I/O) devices 712. Such I/O devices 712 may include a display, various user interface controls (e.g., buttons, joystick, keyboard, mouse, touch screen, etc.), microphone, audio speakers, connection ports and so forth.

The foregoing figures and description illustrate several examples and describe algorithms for those examples; however one skilled in the art having the benefit of the disclosure herein may apply these same ideas to a variety of other low power sensor applications or develop algorithms of a similar function. Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A compressive sensing sensor block comprising:
a compressed sensing block including a circuit comprising a random number generator and an analog-to-digital converter (ADC), wherein the random number generator is configured to generate random values used for controlling sensor signal sampling performed by the ADC to cause the ADC to take random samples of a sensor signal from a first sensor and output raw compressed sensing data comprising at least one random sample of the sensor signal from the first sensor;
a post processor coupled to the compressed sensing block to receive the raw compressed sensing data comprising the at least one random sample; and
a communication interface coupled to the post processor to receive the raw compressed sensing data comprising the at least one random sample from the post processor and send the raw compressed sensing data comprising the at least one random sample to another compressive sensing sensor block, wherein receipt of the raw compressed sensing data comprising the at least one random sample of the sensor signal from the first sensor by the other compressive sensing sensor block conserves power in the other compressive sending block by causing the other compressive sensing sensor block to delay taking a next random sample of a sensor signal of a second sensor associated with the other compressive sensing sensor block;
wherein the post processor is configured to:
convert the raw compressed sensing data comprising the at least one random sample into compressed sensing data by at least one of packetizing or encrypting the data;
cause the communication interface to send the compressed sensing data to a computing device; and utilize the random number generator to generate a randomization matrix used for encrypting the compressed sensing data prior to sending to the computing device.

2. The compressive sensing sensor block as recited in claim 1, wherein the communication interface comprises a transmitter and an antenna for wirelessly sending at least one of:

the raw compressed sensing data comprising the at least one random sample to the other sensor block; or the compressed sensing data to the computing device.

3. The compressive sensing sensor block as recited in claim 1, wherein the communication interface comprises a wired connection for sending at least one of:

the raw compressed sensing data comprising the at least one random sample to the other sensor block; or the compressed sensing data to the computing device.

4. The compressive sensing sensor block as recited in claim 1, wherein the random number generator generates pseudorandom numbers as the random values used for controlling sensor signal sampling performed by the ADC to take the random samples.

5. The compressive sensing sensor block as recited in claim 1, wherein the compressive sensing sensor block and a plurality of the other compressive sensing sensor blocks are configured to send at least one of the raw compressed sensing data comprising the at least one random sample or the compressed sensing data in at least one of:

a point-to-point network configuration;

a multi-hop network configuration; or a mesh network configuration.

6. The compressive sensing sensor block as recited in claim 1, further comprising a storage for receiving the raw compressed sensing data comprising the at least one random sample prior to sending to at least one of the other compressive sensing sensor block or a computing device, wherein at least one of the storage, the post-processor, or the communication interface cycle between an active state and a quiescent state based at least in part on at least one of:

an occurrence of sampling of the sensor signal by the compressive sensing sensor block; or an amount of the raw compressed sensing data stored in the storage reaching a threshold amount.

7. The compressive sensing sensor block as recited in claim 1, further comprising a clock gate in communication with the compressed sensing block to gate a clock signal controlled by a random time instance, wherein the random time instance is based at least in part on at least one of:

a network IP address;

a signal from a computing device generated at least in part by a random number generator or a pseudorandom number generator; or a unique parameter.

8. The compressive sensing sensor block as recited in claim 1, wherein compressive sensing sensor block is in communication with a computing device programmed to at least one of:

reconstruct the compressed sensing data to generate a representation of the sensor signal;

perform predictive analytics on the reconstructed compressed sensing data; or provide access of third party tools to the compressed sensing data.

9. A method comprising:

obtaining, by a first sensor block of a plurality of sensor blocks, raw compressed sensing data comprising the at least one random sample by randomly sampling a first sensor signal from a first sensor coupled to the first sensor block;

sending, by the first sensor block, the raw compressed sensing data comprising the at least one random sample obtained from the randomly sampled first sensor signal to a second sensor block of the plurality of sensor blocks, wherein receipt of the raw compressed sensing data comprising the at least one random sample obtained from the first sensor signal conserves power in the second compressive sending block by causing the second sensor block to delay taking a next random sample from a second sensor signal from a second sensor coupled to the second sensor block;

using, by the second sensor block, a post processor to convert the raw compressed sensing data comprising the at least one random sample to compressed sensing data by at least one of packetizing or encrypting the raw compressed sensing data comprising the at least one random sample to generate the compressed sensing data;

sending, by the second sensor block, using a communication interface, the compressed sensing data to a computing device; and utilizing a random number generator to generate a randomization matrix used for encrypting the raw compressed sensing data prior to sending to the computing device.

10. The method as recited in claim 9, wherein obtaining the raw compressed sensing data comprising the at least one random sample by randomly sampling the first sensor signal is performed using a compressed sensing block included in the first sensor block, the compressed sensing block comprising the random number generator and an analog-to-digital converter (ADC), wherein the random number generator is configured to generate random values used for controlling sensor signal sampling performed by the ADC to cause the ADC to take random samples of the first sensor signal to obtain the raw compressed sensing data comprising the at least one random sample from the first sensor signal.

11. The method as recited in claim 9, further comprising randomly duty cycling respective ones of the plurality of sensor blocks to cause the individual sensor blocks to randomly sample respective sensor signals from respective sensors coupled to the respective sensor blocks.

12. The method as recited in claim 9, further comprising using a clock gate to gate a clock signal controlled by a random time instance to cause the first sensor block to randomly sample the first sensor signal, wherein the random time instance is based at least in part on at least one of:

a network IP address;

a signal from a computing device generated at least in part by a random number generator or a pseudorandom number generator; or a unique parameter.

13. The method as recited in claim 9, wherein respective sensor blocks of the plurality of sensor blocks are configured to distribute at least one of the raw compressed sensing data comprising the at least one random sample, or the compressed sensing data to the plurality of sensor blocks using at least one of:

a point-to-point network configuration;

a multi-hop network configuration; or a mesh network configuration.

14. A system comprising:
a plurality of sensor blocks, each sensor block comprising:
a compressed sensing block to receive a sensor signal from a respective sensor, the compressed sensing block including a circuit to take a random sample of the sensor signal and output raw compressed sensing data comprising at least one random sample;
a post processor coupled to the compressed sensing block to receive the raw compressed sensing data comprising the at least one random sample; and
a communication interface coupled to the post processor to receive the raw compressed sensing data comprising the at least one random sample from the post processor and send the raw compressed sensing data comprising the at least one random sample to a computing device,
wherein each of the sensor blocks is configured to:
obtain respective raw compressed sensing data comprising the at least one random sample from a randomly sampled sensor signal from the respective sensor coupled to the sensor block; and
send the respective raw compressed sensing data comprising the at least one random sample obtained from the randomly sampled sensor signal to another sensor block of the plurality of sensor blocks, wherein receipt of the respective raw compressed sensing data comprising the at least one random sample of the sensor signal by the other sensor block conserves power in the other compressive sending block by causing the other sensor block to delay taking a next random sample from a respective sensor signal from a respective sensor coupled to the other sensor block;
wherein the post processor is configured to:
convert the raw compressed sensing data comprising the at least one random sample into compressed sensing data by at least one of packetizing or encrypting the raw compressed sensing data;
cause the communication interface to send the compressed sensing data to a computing device; and
utilize a random number generator to generate a randomization matrix used for encrypting the raw compressed sensing data prior to sending to the computing device.

15. The system as recited in claim 14, wherein the computing device is programmed to:
receive the compressed sensing data; and
reconstruct the compressed sensing data along with other received compressed sensing data to generate a representation of the sensor signal.

16. The system as recited in claim 14, wherein the plurality of sensor blocks are configured to distribute the respective raw compressed sensing data comprising the at least one random sample among the plurality of sensor blocks using at least one of:
a point-to-point network configuration;
a multi-hop network configuration; or
a mesh network configuration.

17. The system as recited in claim 14, wherein the circuit of the compressed sensing block comprises the random number generator and an analog-to-digital converter (ADC), wherein the random number generator is configured to generate random values used for controlling sensor signal sampling performed by the ADC to cause the ADC to take the random sample of the respective sensor signal to obtain the respective raw compressed sensing data comprising the at least one random sample.

18. The system as recited in claim 14, wherein each of the sensor blocks includes a clock gate to gate a clock signal controlled by a random time instance to cause the sensor block to randomly sample the sensor signal, wherein the random time instance is based at least in part on at least one of:
a network IP address;
a signal from the computing device generated at least in part by a random number generator or a pseudorandom number generator; or
a unique parameter.

* * * * *